United States Patent
Schevin et al.

(10) Patent No.: US 9,046,959 B2
(45) Date of Patent: Jun. 2, 2015

(54) NOISE REDUCTION IN ELECTRONIC DEVICE WITH TOUCH SENSITIVE SURFACE

(75) Inventors: Olivier Schevin, Boulogne Billancourt (FR); Simon Esteve, Boulogne Billancourt (FR); Remi Duheille, Rueil Malmaison (DE)

(73) Assignee: Elo Touch Solutions, Inc., Milpitas, CA (US)

( * ) Notice: Subject to any disclaimer, the term of this patent is extended or adjusted under 35 U.S.C. 154(b) by 224 days.

(21) Appl. No.: 13/521,913

(22) PCT Filed: Jan. 13, 2011

(86) PCT No.: PCT/EP2011/000124
§ 371 (c)(1),
(2), (4) Date: Oct. 15, 2012

(87) PCT Pub. No.: WO2011/085985
PCT Pub. Date: Jul. 21, 2011

(65) Prior Publication Data
US 2013/0027359 A1    Jan. 31, 2013

(30) Foreign Application Priority Data

Jan. 13, 2010   (EP) ..................................... 10290014
Jan. 3, 2011    (EP) ..................................... 11290001

(51) Int. Cl.
*G06F 3/043*   (2006.01)
*G06F 3/041*   (2006.01)
*G06F 21/83*   (2013.01)

(52) U.S. Cl.
CPC ............ *G06F 3/0418* (2013.01); *G06F 3/0416* (2013.01); *G06F 3/0433* (2013.01); *G06F 21/83* (2013.01)

(58) Field of Classification Search
CPC ... G06F 3/0416; G06F 3/0418; G06F 3/0433; G06F 21/83

USPC .................. 345/156–184; 178/18.01–18.06, 178/19.01–19.06; 340/425.5, 568.1; 715/811; 382/224; 381/71.6, 72, 114, 381/109

See application file for complete search history.

(56) References Cited

U.S. PATENT DOCUMENTS 5,334,805 A * 8/1994 Knowles et al. ............ 178/18.04
5,380,959 A * 1/1995 Knowles .................... 178/18.04

(Continued)

FOREIGN PATENT DOCUMENTS

| CN | 1669048 A | 9/2005 |
|----|-----------|--------|
| CN | 1720498 A | 1/2006 |

(Continued)

OTHER PUBLICATIONS

International Search Report and Written Opinion of the International Searching Authority for Application No. PCT/EP2011/000124, dated Mar. 24, 2011.

(Continued)

*Primary Examiner* — Prabodh M Dharia
(74) *Attorney, Agent, or Firm* — Alston & Bird LLP (57) ABSTRACT

The invention relates to an electronic device with a touch sensitive surface comprising: a sensing means for capturing an acoustic signal, a touch location determining unit configured to determine the location of a touch event on the touch sensitive surface based on the acoustic signal. To improve the reliability of the touch localization process, the device further comprises a filtering unit configured to improve the signal-to-noise ratio of the acoustic signal based on one or more signals provided by one or more spurious acoustic signal generating devices of the electronic device and/or based on one or more parameters of the one or more spurious acoustic signal generating devices of the electronic device. The invention also relates to a corresponding method. The invention furthermore relates to a method for improving the confidentiality of a user input.

24 Claims, 5 Drawing Sheets

(56) References Cited

U.S. PATENT DOCUMENTS

| | | | |
|---|---|---|---|
| 5,591,945 A * | 1/1997 | Kent | 178/18.04 |
| 6,061,177 A * | 5/2000 | Fujimoto | 359/443 |
| 6,473,075 B1 * | 10/2002 | Gomes et al. | 345/177 |
| 6,535,147 B1 * | 3/2003 | Masters et al. | 341/34 |
| 6,630,929 B1 * | 10/2003 | Adler et al. | 345/177 |
| 7,525,050 B1 | 4/2009 | Weaver et al. | |
| 7,884,805 B2 * | 2/2011 | Thorn | 345/173 |
| 8,019,449 B2 * | 9/2011 | Barzegar et al. | 700/94 |
| 8,154,382 B2 * | 4/2012 | Crucs | 340/5.71 |
| 8,179,372 B1 * | 5/2012 | Delano et al. | 345/173 |
| 8,418,237 B2 * | 4/2013 | Barbour et al. | 726/7 |
| 2001/0006006 A1 | 7/2001 | Hill | |
| 2002/0050983 A1 * | 5/2002 | Liu et al. | 345/173 |
| 2003/0217873 A1 * | 11/2003 | Paradiso et al. | 178/18.04 |
| 2004/0064711 A1 | 4/2004 | Fernando et al. | |
| 2005/0156911 A1 * | 7/2005 | Tanaka et al. | 345/177 |
| 2005/0212777 A1 | 9/2005 | Ing et al. | |
| 2006/0120537 A1 * | 6/2006 | Burnett et al. | 381/71.6 |
| 2006/0262104 A1 * | 11/2006 | Sullivan et al. | 345/177 |
| 2007/0182535 A1 * | 8/2007 | Seguchi | 340/457.1 |
| 2009/0122028 A1 | 5/2009 | Ing | |
| 2011/0087990 A1 * | 4/2011 | Ng et al. | 715/773 |
| 2011/0096036 A1 * | 4/2011 | McIntosh et al. | 345/177 |

FOREIGN PATENT DOCUMENTS

| | | |
|---|---|---|
| CN | 101198861 A | 6/2008 |
| WO | WO-00/57262 | 9/2000 |
| WO | WO 2004/053781 A2 | 6/2004 |

OTHER PUBLICATIONS

Office Action for European Application No. 11700318.6; dated Jun. 12, 2013.

Office Action for Chinese Application No. 201180011585.1 dated Dec. 29, 2014.

* cited by examiner

NOISE REDUCTION IN ELECTRONIC DEVICE WITH TOUCH SENSITIVE SURFACE

The invention relates to an electronic device with a touch sensitive surface comprising: a sensing means for capturing an acoustic signal, a touch location determining unit configured to determine the location of a touch event on the touch sensitive surface based on the acoustic signal. The invention also relates to a corresponding method to improve the signal-to-noise ratio and to a method for improving the confidentiality of a user's touch based input to an electronic device.

Electronic devices with touch sensitive interfaces become more and more popular. To provide inputs to the electronic device, a user touches the surfaces, e.g. by a tap or a sliding action and, based on the location of the input, the electronic device carries out certain functionalities. One of the existing technologies analyses acoustic signals, which can be observed after a touch event has occurred on a surface to determine the location of the touch event. This technology has the advantage that actually any material capable of transmitting acoustic waves can be used as an interface.

However, when the haptic interface is immersed in a noisy environment, the sensors used to capture the acoustic signals of a touch event also pick up noise pollution that can decrease performances in the touch event detection and the localization of the touch event.

Furthermore, in acoustic systems the location of a touch is determined by comparing the sensed signal with predetermined acoustic signatures stored in databases. The predetermined acoustic signatures can be established using an experimental calibration set-up or computed using the properties of the material, the design of the device and the position of the sensors. Due to a possibility to establish the acoustic signatures based on a model, touch interactions could be analyzed by unauthorized persons sensing the acoustic signals by secretly attaching an additional unauthorized sensor to the touch sensitive interface in order to identify locations associated with a series of taps or touch events. Doing so, confidential information like a pin code used in an ATM or a vending machine could potentially be identified by the unauthorized persons.

Concerning noise pollution as described further above, prior art document US 2006/0262104 describes a system that distinguishes touch events from external noise pollutions, especially acoustic noise coming from the surrounding environment or vibrations transmitted to the haptic interface through the mechanical parts in contact with it, by analyzing the frequency spectrum of the measured signal. Signals not representing certain frequency properties will be rejected before determining a meaningless localisation. This method tends to work well when the noise pollution is not too high compared to touch events that need to be processed. When the signal-to-noise ratio becomes too low, i.e. when the amplitude of the noise pollution is in the same order of magnitude as the touch events or even higher, this method tends to be less efficient, as touch events can completely disappear inside the noise and will be no longer detected.

It is therefore the object of the present invention to provide an electronic device with a touch sensitive surface that can improve the signal quality of the acoustic signal, based on which, the localisation of a touch event will be determined and/or which can improve the confidentiality of user interactions with the electronic device.

This object is achieved with the electronic device and the methods according described herein.

Accordingly, the invention relates to an electronic device with a touch sensitive surface comprising: a sensing means for capturing an acoustic signal, a touch location determining unit configured to determine the location of a touch event on the touch sensitive surface based on the acoustic signal, characterized in further comprising a filtering unit configured to improve the signal-to-noise ratio of the acoustic signal based on one or more reference signals provided by one or more spurious acoustic signal generating devices of the electronic device and/or based on one or more parameters of the one or more spurious acoustic signal generating devices of the electronic device. The invention takes advantage of the fact that, in such an electronic device, information about the properties of the noise, internal or external to the device, is already available and signals or parameters strongly correlated to the noise can be provided by the components without having to provide dedicated noise detecting devices. In contrast to the prior art, one does not discriminate between real touch events and spurious ones, but the signal quality is improved by removing, at least partially, the spurious noise contributions.

Here the term "touch event" relates to any kind of contact with the touch sensitive surface, like a tap or taps, which can be a single touch event or a multi-touch event, and/or a sliding action and/or a holding action.

Advantageously, the spurious acoustic signal generating device or one of the spurious acoustic signal generating devices can be configured to provide a spurious acoustic signal such that the sensed acoustic signal comprises a contribution due to the touch event and the spurious acoustic signal, wherein the ratio of the contribution due to the touch event to the spurious acoustic signal is less than or equal to 1. By masking the contribution which arises due to the touch event provided by the user with the spurious signal, an unauthorized person will no longer be in the position to sense a signal from which, based on a realistic model of the properties of the touch sensitive surface of the electronic device, information about the touch location of the touch event can be established. Thus a pin code on the touch sensitive interface input by the user via the touch sensitive surface is protected against unwanted disclosure. In the filtering unit the known spurious acoustic signal can then be filtered out and the remaining useful signal can be used to determine the location of the touch event.

Preferably, the spurious acoustic signal generating device comprises a signal encrypting means to encrypt the reference signal and the filtering unit comprises a decrypting means to decrypt the reference signal. Thus, also the transfer of the reference signal towards the filtering unit is protected such that, even if an unauthorized person would be capable of intercepting the reference signal, it cannot be exploited to have access to the contribution in the signal which is due to the user interaction.

Advantageously, the sensing means can comprise a sensed signal encrypting means to encrypt the sensed signal and the filtering unit comprises a decrypting means to decrypt the reference signal. This will further improve the protection against unauthorized persons trying to obtain access to the useful signal.

Preferably, the spurious acoustic signal can be a noise signal, in particular white noise. As there is no particular pattern in a noise signal, an unauthorized person will not be able to identify properties of the spurious acoustic signal and thus the creation of a functioning filtering unit without knowing the spurious acoustic signal itself becomes impossible.

Advantageously, the spurious acoustic signal can be inaudible. In this case users are not disturbed by the spurious signal.

Preferably, the filtering unit can comprise an adaptive filtering unit. By using an adaptive filtering unit, the noise reduction automatically adapts to changing situations in which the properties of the noise changes.

According to an advantageous embodiment, the electronic device can furthermore comprise a switching means configured to switch between the reference signals or parameters provided by the spurious acoustic signal generating devices to provide one signal to the filtering unit. Using such a switching means, it becomes possible to change the filtering such that a predominant noise contributor is taken into account to improve the signal-to-noise ratio, without however having to provide a plurality of noise contributor inputs to the filtering unit. Thus the design of the filtering unit can be kept simple.

Preferably, the electronic device can further comprise a summing means configured to sum up at least two of the reference signals of the spurious acoustic signal generating devices and/or parameters. By simply adding the summing means, a plurality of noise contributors can be taken into account by simply summing their contributions to further improve noise reduction.

Advantageously, the one or more parameters are at least one of a frequency range and associated amplitude. Based on these properties, an appropriate filtering means can be chosen to reduce the noise contribution to the acoustic signal used to determine the location of a touch event.

According to a preferred embodiment, the one or more spurious acoustic signal generating devices can be at least one of a loudspeaker, a microphone, a vibrating device, an accelerometer, a hard disk drive, a ventilator, power supply and an electronic component. These devices are thus either generating noise to the acoustic signal used to determine the localisation of an impact, thus their contribution/s need/s to be reduced, or capture the environmental noise (microphone) and can thus provide a signal representing the acoustic noise in the local environment of the electronic device.

Advantageously, the electronic device can be at least one of a mobile phone, a computer, a game console, an electronic book reader, a MP3 player, a video player, a HiFi player and/or a navigation device. These devices all have at least one spurious acoustic signal generating device, the signal or parameter of which can be used to improve the signal to noise ratio.

Preferably, the electronic device can be a handheld device. Even in changing environments with changing noise level, which is a common situation for handheld devices, the electronic device according to the invention will be able to reduce the noise contribution based on the signals or parameters of the built-in other devices.

The invention furthermore relates to an integrated chip set comprising a filtering unit and a touch localisation unit for use in the electronic device as described above. Thus the functionality of touch localisation and the filtering unit to improve the signal can be embedded into a chip set to facilitate integration of the electronic device.

The object of the invention is also achieved with a method for improving the signal-to-noise ratio of an acoustic signal used in an electronic device to determine the location of a touch event on a touch sensitive surface, comprising the steps of: a) capturing an acoustic signal, b) determining the location of a touch event, in particular a tap or sliding action, on the touch sensitive surface based on the captured acoustic signal, characterized in further comprising a step c) of providing prior to step b) one or more spurious acoustic signal generating devices of the electronic device and/or based on one or more parameters of the one or more spurious acoustic signal generating devices of the electronic device, to improve the signal-to-noise ratio of the acoustic signal. With this method the same advantages as described above concerning the inventive electronic device can be achieved.

According to a preferred realization, step c) can comprise providing a noise reference signal using one or more signals of the one or more spurious acoustic signal generating devices of the electronic device and/or using one or more of the one or more parameters of the one or more spurious acoustic signal generating devices of the electronic device and inputting the noise reference signal into a reference input of an adaptive filtering unit to reduce the noise contribution to the captured acoustic signal. With the reference signal taking into account the contributions of a plurality of noise contributors and using an adaptive filtering unit which can change the properties of the filtering action on the acoustic signal used for the touch localisation, changing noise properties, concerning frequency and amplitude, can be easily taken into account.

Advantageously, step c) can further comprise using only one signal or parameter using a switching means. Using a switching means is a simple way to adapt the filtering to the most important noise contributor.

Preferably, step c) can further comprise summing up at least two of the signals and/or parameters to form the reference signal. Thus the noise contributions of a plurality of devices can be taken into account by simply providing a summing means to the filtering unit.

The object of the invention to improve the confidentiality of a user's touch based input to an electronic device with a touch sensitive surface is achieved with the method according to claim 19 comprising the steps of: a) providing a spurious acoustic signal in and/or around the touch sensitive surface, b) sensing an acoustic signal with a sensing means, the sensed acoustic signal comprising a contribution due to a touch event provided by the user on the touch sensitive surface and a contribution due to the spurious acoustic signal, wherein the ratio of the contribution due to the touch event to the spurious acoustic signal is lower or equal to 1, c) filtering the sensed acoustic signal based on a reference signal representative of the spurious acoustic signal thereby reducing the contribution of the spurious acoustic signal, and d) determining the location of the touch event based on the filtered sensed acoustic signal.

By masking the signal due to the touch event of the user with the spurious acoustic signal, an unauthorized person, even if measuring the acoustic signal present in or around the touch sensitive surface, will not be able to access the signal due to touch event. In contrast thereto by using the reference signal it will still be possible to determine the touch location out of the sensed signal.

Preferably, the reference signal can be provided by the spurious acoustic signal providing means to the filtering unit. In particular, the reference signal corresponds to the control signal used to form the spurious acoustic signal. Thus the filtering unit knows the properties of the spurious acoustic signal and can effectively clear the sensed signal from the masking signal to improve the touch location determining process.

According to an advantageous embodiment, the reference signal can be encrypted by the spurious acoustic signal providing means and/or the sensed acoustic signal can be encrypted by sensing means and the reference signal and/or the sensed acoustic signal is/are decrypted by the filtering unit. Thus even if the sensing means and/or the spurious acoustic signal are spaced apart from the filtering unit, the signals are protected against fraudulent use by unauthorized persons.

Advantageously, the spurious acoustic signal can be noise, in particular white noise. As there is no particular pattern in a noise signal, an unauthorized person will not be able to identify properties of the spurious acoustic signal and thus the creation of a functioning filtering unit without knowing the spurious acoustic signal itself becomes impossible.

Advantageously, the spurious acoustic signal can be inaudible. In this case users are not disturbed by the spurious signal.

According to a preferred embodiment, the method for improving the confidentiality of a user input can further comprise a step e) before or after step c) of providing at least one second reference signal of an at least one second spurious acoustic signal generating device of the electronic device and/or one or more parameters of the at least one second spurious acoustic signal generating device to improve the signal-to-noise ratio of the sensed acoustic signal or the filtered sensed signal. Thus to improve the reliability of the touch location determination process, further noise sources can be taken into account to improve the signal-to-noise ratio.

The invention with its features and advantages will be described in detail in the following using embodiments illustrated in the appended Figures.

Figure 1A:
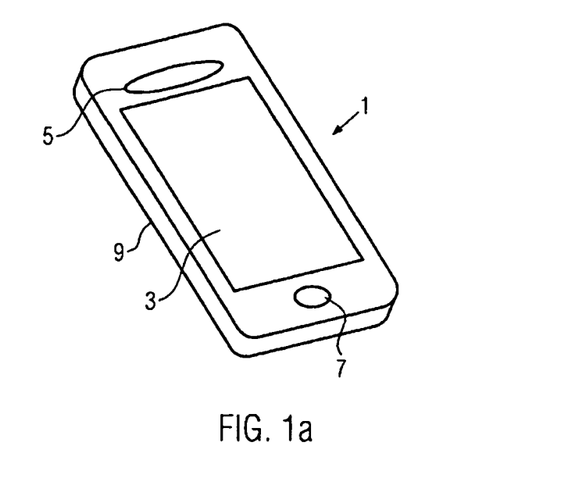
FIG. 1*a* illustrates an electronic device.
Figure 1B:
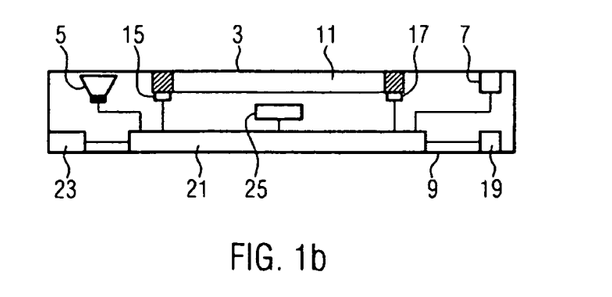
FIG. 1*b* illustrates schematically the various components of the electronic device, FIG. 2 schematically illustrates a first embodiment of an electronic device according to the invention, FIG. 3 schematically illustrates a second embodiment of an electronic device according to the invention, FIG. 4 schematically illustrates a third embodiment of an electronic device according to the invention.

FIG. 1*a* illustrates an electronic device 1, here a mobile telephone, with a housing 9 comprising a touch sensitive surface 3, a loud speaker 5 and a microphone 7. Inside the housing 9, the electronic device 1 further comprises a plurality of components as illustrated in FIG. 1*b*. Underneath the touch sensitive surface 3, the electronic device 1 comprises a display 11 with a region 13 under which/or within which first and second sensing means 15 and 17 are attached. These sensing means 15 and 17, for instance piezoelectric transducers, accelerometers, microphones etc., capture acoustic signals generated as a consequence of a touch event on the touch sensitive surface 3 which leads to the formation of bending waves travelling through the surface of the interaction surface. Based on the captured signals, the location of the touch event can be determined using for instance the method as described in WO 2006/108443. A touch event typically relates to any kind of contact like a tap or taps, like a single touch or a multi-touch, on the surface and/or a sliding action over the surface and/or a hold action. Here two sensing means 15 and 17 are illustrated, however, without departing from the scope of the invention, more or less sensing means can be provided, which also depends on the accuracy one is looking for.

Inside the housing 9, the electronic device furthermore comprises the loud speaker 5, the microphone 7 but also a vibrating device 19 which is used to provide a vibrating signal in addition to a ring tone to alert a user of an incoming call. The elements are connected to an integrated circuit (IC) board 21 comprising the electronic components for treating the various signals. FIG. 1*b* further illustrates schematically the presence of a power supply 23. Additional components such as a hard disk drive, an accelerometer, a ventilator etc could also be provided in the electronic device, but are not illustrated in FIG. 1*b*.

The mobile telephone only represents one example of an electronic device to which the invention can be applied. The electronic device could also be a computer, a game console, an electronic book reader, an MP3 player, a video player, a HiFi player or a navigation device. The electronic device can be a handheld or a desktop device.

Like already mentioned, the electronic device ensures the touch sensitive functionality using an acoustic technology. The signals captured by the touch sensing means 15 and 17 based on which the location of a touch event can be determined, do, however, not only carry the information of the touch event, but also carry spurious contributions in the frequency range used for the localization, which is typically in the range from 0 to 20 kHz (audio range) but can be extended up to 100 kHz. These spurious contributions reduce the quality of the signal and a correct localisation of a touch event becomes more difficult or even impossible.

The invention thus aims at improving this situation by improving the signal-to-noise ratio of the acoustic signals captured by the sensing means 15 and 17. To do so, the invention takes advantage of the fact that the electronic device 1, as illustrated in FIG. 1*a*, itself already comprises a number of components, which can provide information that is correlated with the noise pollution picked up by the sensing means 15 and 17. This information already present in any electronic device of the type described above, can thus be used to provide a noise reference used to filtered signals captured by the sensing means 15 and 17.

In detail:

In the electronic device 1, illustrated in FIGS. 1*a* and 1*b*. the signal driving the loud speaker 5 is one source of information that can be used to remove noise due to the output of the loud speaker.

But also, electromagnetic and electric noise generated by the power supply 23 or the electronic components of the IC board 21 could be analysed upfront and parameters, such as frequency ranges and corresponding amplitudes, be determined which strongly correlate to the noise contribution by these components to the signals captured by the sensing means 15 and 17.

The noise coming from a vibrating device 19 can also be filtered out, as the vibrating frequency of the device is typically known. The filtering means can be tuned to this frequency to be able to reduce the noise contribution of the vibrating device 19. Other kinds of vibrations could, for instance, be generated by the spinning hard disc drive or the accelerometers, in case such a component is present in the electronic device.

Further, the acoustic noise surrounding the electronic device, including any utterances provided by the user of the electronic device 1, can be captured by the microphone 7, which therefore is capable of providing a signal that can be used to reduce the contribution of that noise to the signals captured by the sensing means 15 and 17.

Thus, the invention provides a special filtering unit 25 that is configured to improve the signal-to-noise ratio of the acoustic signal captured by the sensing means 15 and 17 using the signals or known parameters provided by components already present in the electronic device 1. Here the loud speaker 5, the microphone 7, the vibrating device 19, the electronic components of the IC board 21 and the power supply 23 can also be called spurious acoustic signal generating devices, the term used in the claims.

Figure 2:
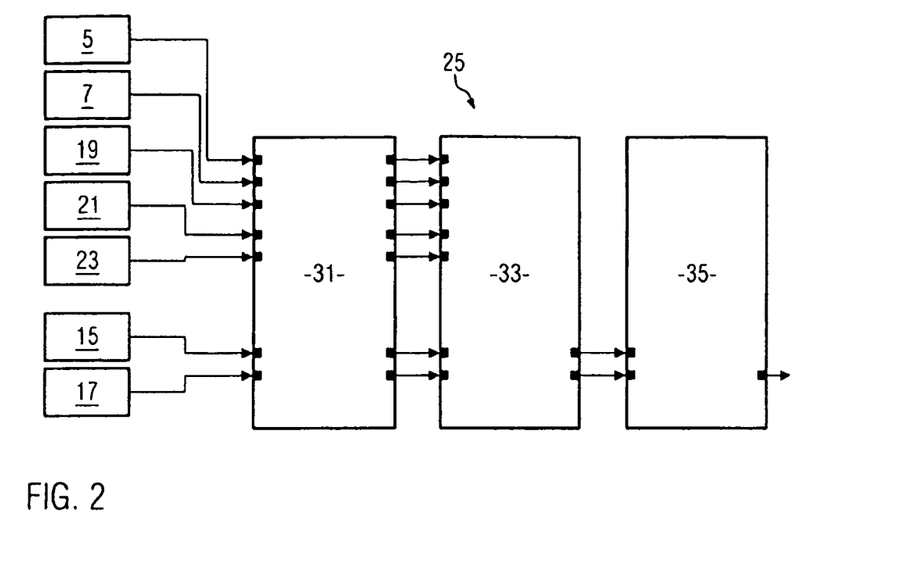

FIG. 2 illustrates a first embodiment of such a filtering unit 25. The signals or parameter values of the spurious acoustic signal generating devices 5, 7, 19, 21 and 23, as well as the signals captured by the sensing means 15 and 17, are input into an acquisition device 31 configured, amongst others, to convert analogue input signals into digital signals.

The signals or parameter values provided by the spurious acoustic signal generating devices then serve as reference signals input into a filtering device 33 of the filtering unit 25. They are used to filter out, at least partially, spurious contributions to the acoustic signals captured by the sensing means 15 and 17 and which are also input into the filtering device 33.

The filtering device 33 is then configured to provide at its output, acoustic signals from which noise contributions have been at least partially removed. These acoustic signals with improved signal to noise ratio are then Input Into a touch location determining unit 35 which is configured to identify a touch event and its location on the touch sensitive surface 3 based on the improved acoustic signals.

According to a variant of the invention, the filtering device 33 and the a touch location determining unit 35 are incorporated into one IC chip of the IC board 21.

Figure 3:
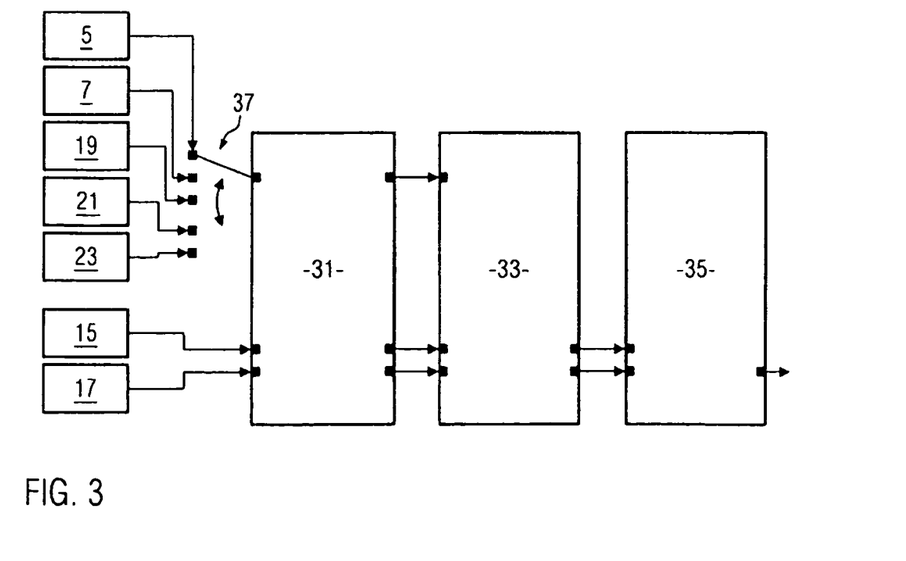

FIG. 3 illustrates a second embodiment of the invention. The only difference with respect to the first embodiment is that the acquisition device 31 only receives one signal or parameter from a spurious acoustic signal generating device 5, 7, 19, 21, 23 at a time. This design simplifies the acquisition device 31.

A switching means 37 is provided which allows changing the source of the reference signal used for filtering the acoustic signals provided by sensing means 15 and 17 in the filtering means unit 33 so that, for instance, the most important noise contributor of the spurious acoustic signal generating devices can input its signal into the filtering unit 33. The switching means 37 can be either an automatic or a manual switch which can be used by a user.

Figure 4:
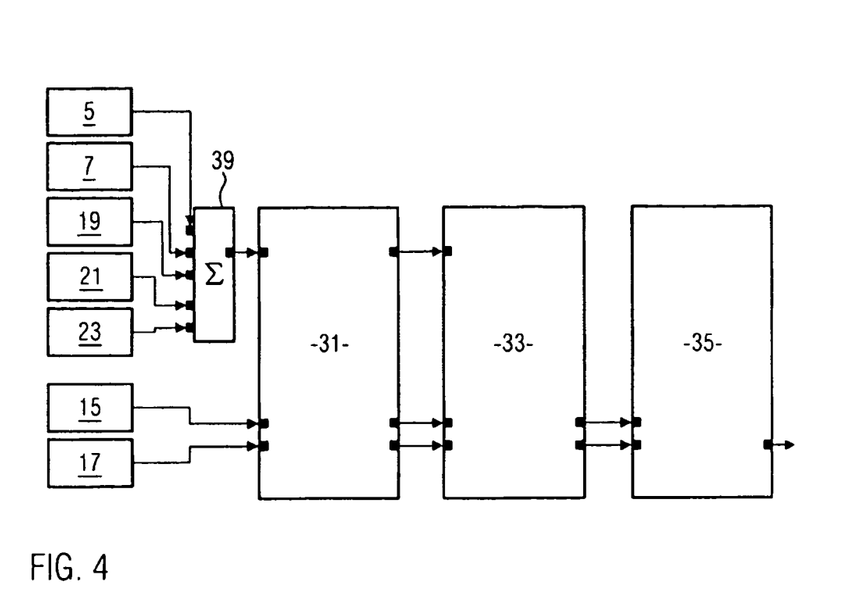

FIG. 4 illustrates a third embodiment in which, compared to the first embodiment, again only one reference signal is provided to the filtering unit 33, however, in contrast to the second embodiment, a summing means 39 is provided between the spurious acoustic signal generating devices 5, 7, 19, 21, 23 and the acquisition device 31, so that actually all noise contributors are taken into account without, however, having to provide the plurality of acquisition lines and a plurality of reference signals to the filtering unit which keeps the overall design simpler compared to the first embodiment.

Figure 5:
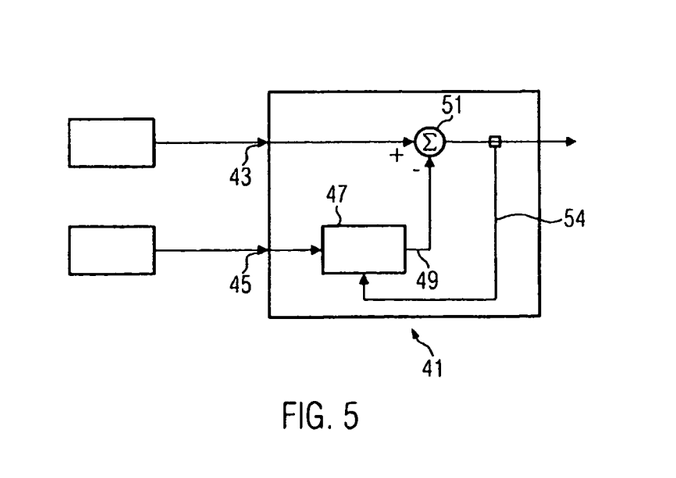
FIG. 5 illustrates a filtering unit which can be used in any one of the first to third embodiments.

FIG. 5 illustrates an example of an adaptive filtering unit 41 which can be used in any one of the first to third embodiments as filtering means 33.

FIG. 5 illustrates an adaptive filtering unit 41 which adapts the filtering parameters or coefficients to changing characteristics of acoustic signals and reference signals in real time. The adaptive filtering device 41 has an acoustic signal primary input 43 and a noise reference input 45. Of course, depending on the amount of sensing means 15 and 17, and the amount of reference signals used for the noise reduction, the amount of inputs can be adapted, accordingly.

The primary input 43 receives the signal of interest polluted by the noise contribution.

The reference signal, in turn, enters via the reference input 45 into an adaptive filter 47. The adaptive filter 47 adjusts its coefficients in order to minimize the value of the error signal 54 obtained at the summing knot 51 by subtracting the filtered reference signal provided at the filter output 49 to the acoustic signal input at the primary input 43. As long as the reference signal remains correlated to the noise contribution present in the acoustic signal input, the error signal 54 converge to the desired acoustic signal input.

FIG. 5 only illustrates one possibility of a suitable filter unit 33, as actually any algorithms used in noise cancelling applications can be implemented. For instance, in case that the nature of the disturbing signal is actually known beforehand, like in the case of the known vibrating frequency of the vibrating device 19, an adaptive filter can be provided which does not need a reference signal as such. In the case of a strong periodic noise (vibrating device), an automatic notch filter can be used to reduce the spurious contribution from the acoustic signal. In this particular case, the reference signal can simply be a delayed version of the acoustic signal input. By adjusting this delay to the known period of the disturbance noise, this "virtual" reference signal is only correlated to the periodic noise present in the acoustic signal. This ensures the removal of the periodic disturbance from the desired acoustic signal by the adaptive filter.

Figure 6:
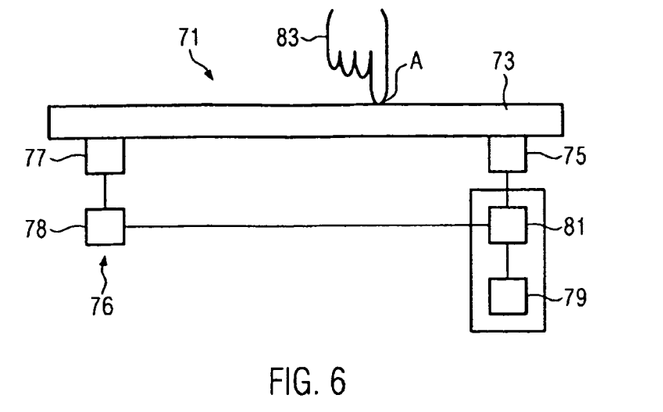
FIG. 6 schematically illustrates a fourth embodiment of an electronic device according to the invention to improve the confidentiality of a user input, FIG. 7 schematically illustrates a fifth embodiment of an electronic device according to the invention to improve the confidentiality of a user input.

FIG. 6 schematically illustrates a fourth embodiment of an electronic device according to the invention which is configured to improve the confidentiality of a user input provided on a touch-sensitive surface of the electronic device.

The electronic device 71, which could be an automatic teller machine, an automatic vending machine or, in general, any other type of electronic device allowing a touch-based input, comprises a touch-sensitive surface 73 and a sensing means 75, which is comparable to the sensing means 15 or 17 as illustrated in the embodiment illustrated in FIG. 1a and can thus be a piezoelectric transducer, an accelerometer, microphone etc. FIG. 6 illustrates only one sensing means 75, however, the electronic device 73 may comprise more than just one a sensing means. Based on the captured signal, the location of a touch event can be determined as for the embodiment illustrated in FIG. 1a.

Electronic device 71 furthermore comprises a spurious acoustic signal generating device 76 configured to inject known vibrations into the touch-sensitive surface 73. The spurious acoustic signal generating device 76 has a control unit 78 controlling an emitter 77 such that a masking signal, for instance white noise which preferably is inaudible, is injected into the touch-sensitive surface 73. Thus, the spurious acoustic signal generating device 76 serves as a masking signal source.

According to the invention, the control signal provided by the control unit 78 to the emitter 77 is also sent as a reference signal to a filtering unit 79. The filtering unit 79 is configured to improve the signal-to-noise ratio of the acoustic signal sensed by the sensing means 75, to reduce or remove the contribution to the sensed signal due to the spurious acoustic signal generating device 76. The filtered signal now essentially comprises a signal contribution which is due to a touch event at position A provided by a user's hand 83 on surface 73. The filtered signal is then sent to a touch location determining unit 81 where the touch location A is determined.

The signal injected by the spurious acoustic signal generating means 76 is chosen such that the ratio between the contribution to the sensed signal, which is due to the user interaction at position A, to the signal contribution, which is due to the spurious acoustic generating means 76, is smaller than 1. As a consequence, an unauthorised person who could capture the acoustic signal present in or around the user interaction surface 73, for instance by placing a sensing means on the user interaction surface 73, will not be able to identify the properties of the signal contribution due to the user interaction as he does not know the properties of the injected spurious acoustic signal. Thus, the confidentiality of the user input can be improved by using the additional spurious signal. If the electronic device 71 is used as a user interface in an automatic teller machine or a vending machine, a PIN code or another confidential input—name and address—cannot be identified by unauthorised person. As the signal properties concerning the injected spurious acoustic signal can be freely chosen, each individual device can have its individual protection against unauthorised attacks which will further improve safety of the device against fraud.

Compared to conventional user interaction means based on keypads, the acoustic technology furthermore has the advantage that any additional unauthorised elements connected to the touch-sensitive surface 73 will change the properties of the acoustic signatures, so that an additional sensing element attached to the surface can be identified, for instance during a recalibration run.

Figure 7:
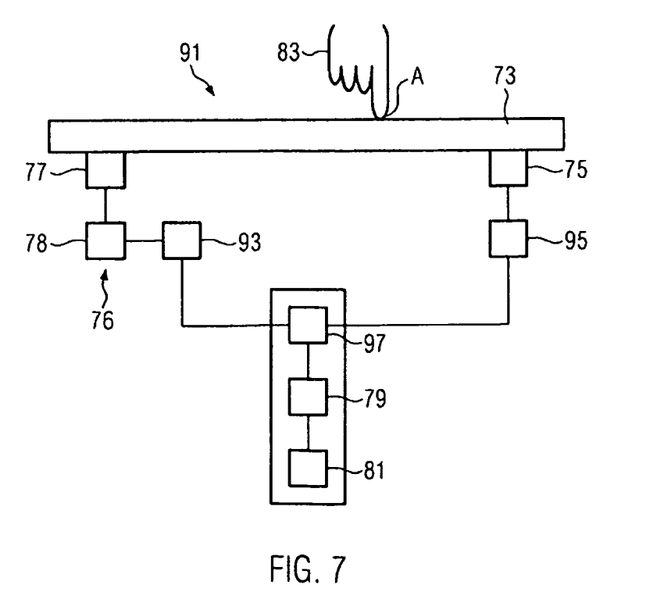

FIG. 7 illustrates schematically a fifth embodiment of an electronic device according to the invention. Elements carrying the same reference numerals as in FIG. 6 will not be explained in detail again but reference is made to the fourth embodiment and the description is incorporated herewith. The electronic device 91, according to the fifth embodiment, essentially comprises the same elements as the electronic device 71 of the fourth embodiment, namely a user interaction interface being a touch-sensitive surface 73, a sensing means 75, a filtering unit 79, a touch location determining unit 81, as well as the spurious acoustic signal generating means 76 with the control unit 78 and the emitter 77.

In contrast to the electronic device 71 of the fourth embodiment, the filtering unit 79 and the touch location determining unit 81 of the fifth embodiment are spaced apart from the sensing means 75 and the acoustic generating means 76, so that there could be a risk of an unauthorised person intercepting the signal sensed by the sensing means 75 and the spurious acoustic signal injected by the spurious acoustic generating means 76, in which case, the unauthorised person could get access to the properties of the masking signal used to mask the contribution to the sensed signal which arises from a user touching the touch-sensitive surface 73 at location A with his hand 83. To reduce this risk, the fifth embodiment is configured to encrypt the reference signal provided by the control unit 78 in encryption unit 93 as well as to encrypt the sensed signal in the encryption unit 95. Prior to filtering the signals, a decrypting unit 97 is used. According to a variant, only the reference signal transfer between the spurious acoustic generating means 76 and the filtering unit 97 could be encrypted.

The fourth and fifth embodiments, dealing with an electronic device which improves the confidentiality of a user input, can be combined with any one of the previously described first to third embodiments so that the signal-to-noise ratio of the sensed signal can be even further improved by taking into account environmental noise due to other spurious acoustic signal generating means, such as the loud speaker 5, the microphone 7, the vibrating device 19, the electronic components of the IC board 21 and the power supply 23 as described above and which reduce the signal quality. Thus, in addition to an improved confidentiality level of a user input, the combination of embodiments provides an improved reliability concerning the touch location detection, even in a noisy environment.

The solutions proposed in the fourth and fifth embodiments have the advantage that masking signals can be individually adapted to each device and that a change of the acoustic properties, due to the presence of an additional unauthorised sensing means, can be detected (even automatically) so that the vending machine or the automatic teller machine can stop accepting inputs. Compared to inputting means for such machines allowing confidential inputs based on mechanical buttons needing additional security features to block access to the machine upon detection of a manipulation, the solution based on acoustic signals can be realised in an economic way.

Figure 8:
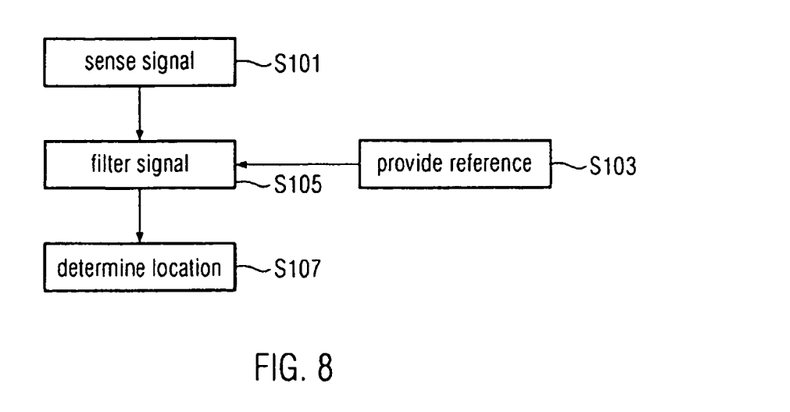
FIG. 8 illustrates schematically a block diagram of a method for improving the confidentiality of a user input according to a sixth embodiment of the invention.

FIG. 8 illustrates a sixth embodiment according to the invention relating to a block diagram illustrating the inventive method concerning the fourth and fifth embodiments.

Step S101 consists in sensing a signal with the sensing means 75 which is then sent to the filtering unit 79. According to step S103, at the same time, the spurious acoustic signal generating means 76 provides a reference signal to the filtering unit 79.

Taking into account the reference signal being representative of a masking signal injected by the spurious signal generating means 76 via the emitter 77 into the interaction surface 73. The filtering unit 79 then filters the sensed signal in step S105 to reduce or remove the contribution due to the injected masking signal, from the sensed signal by sensing means 75 so that, essentially, the contribution due to a touch event provided by a user—at location A of the interaction surface 73—remains in the filtered signal.

The filtered signal is then forwarded to the touch location determining unit 81 which, in step S107, can determine the location of the touch interaction or the gesture provided by the user based on the properties of the sensed signal, according to a process known in the art.

According to a further variant, an additional encrypting step could be introduced both with respect to the sensed signal before being forwarded to the filtering unit and/or the spurious acoustic signal provided by the spurious acoustic signal generating means 76 before being sent to the filtering unit to further improve confidentiality of a user input.

The invention claimed is:

1. Electronic device with a touch sensitive surface comprising:
   a sensing means for capturing an acoustic signal
   a touch location determining unit configured to determine the location of a touch event on the touch sensitive surface based on the acoustic signal, characterized in further comprising
   a filtering unit configured to improve the signal-to-noise ratio of the acoustic signal based on one or more reference signals provided by one or more spurious acoustic signal generating devices of the electronic device and/or based on one or more parameters of the one or more spurious acoustic signal generating devices of the electronic device, wherein the reference signal comprises a control signal used to cause the one or more spurious acoustic signal generating devices to form a spurious acoustic signal, wherein the control signal causes a change in at least one property of the spurious acoustic signal output by the one or more spurious acoustic signal generating devices, and the wherein the filtering unit is further configured to use the at least one property to determine at least a portion of the spurious acoustic signal to remove from the acoustic signal.

2. Electronic device according to claim 1, wherein the spurious acoustic signal generating device or one of the spurious acoustic signal generating devices is configured to provide a spurious acoustic signal such that the sensed acoustic signal comprises a contribution due to the touch event and the spurious acoustic signal wherein the ratio of the contribution due to the touch event to the spurious acoustic signal is less than or equal to 1.

3. Electronic device according to claim 2, wherein the spurious acoustic signal generating device comprises a signal encrypting means to encrypt the reference signal and the filtering unit comprises a decrypting means to decrypt the reference signal.

4. Electronic device according to claim 2, wherein the sensing means comprises a sensed signal encrypting means to encrypt the sensed signal and the filtering unit comprises a decrypting means to decrypt the reference signal.

5. Electronic device according to claim 2, wherein the spurious acoustic signal is a noise signal, in particular white noise.

6. Electronic device according to claim 2, wherein the spurious acoustic signal is inaudible.

7. Electronic device according to claim 1, wherein the filtering unit comprises an adaptive filtering unit.

8. Electronic device according to claim 1, further comprising a switching means configured to switch between the reference signals and/or parameters provided by the spurious acoustic signal generating devices to provide one signal to the filtering unit.

9. Electronic device according to claim 1, further comprising a summing means configured to sum up at least two of the reference signals of the spurious acoustic signal generating devices and/or parameters.

10. Electronic device according to claim 1, wherein the one or more parameter is at least one of frequency range and associated amplitude.

11. Electronic device according to claim 1, wherein the one or more spurious acoustic signal generating device is at least one of a loudspeaker, a microphone, a vibrating device, an accelerometer, a hard disk drive, a ventilator, power supply and an electronic component.

12. Electronic device according to claim 1, wherein the electronic device is at least one of a mobile phone, a computer, a game console, an electronic book reader, a MP3 player, a video player, a HiFi player, an automatic teller machine, an access control system, a vending machine and a navigation device.

13. Electronic device according to claim 1, wherein the electronic device is a handheld device.

14. Integrated chip set comprising a filtering unit and a touch localisation unit for use in the electronic device according to claim 1.

15. Method for improving the signal-to-noise ratio of an acoustic signal used in an electronic device to determine the location of a touch event, on a touch sensitive surface, comprising the steps of:
   a. capturing an acoustic signal,
   b. determining the location of a touch event, in particular a tap or a sliding action, on the touch sensitive surface based on the captured acoustic signal, and
   c. providing prior to step b one or more reference signals of spurious acoustic signal generating devices of the electronic device and/or one or more parameters of the one or more spurious acoustic signal generating devices of the electronic device to improve the signal-to-noise ratio of the acoustic signal, wherein the reference signal comprises a control signal used to cause the one or more spurious acoustic signal generating devices to form a spurious acoustic signal, and wherein the control signal causes a change in at least one property of the spurious acoustic signal output by the one or more spurious acoustic signal generating devices; and
   d. using the at least one property to determine at least a portion of the spurious acoustic signal to remove from the acoustic signal.

16. Method according to claim 15, wherein step c comprises providing a noise reference signal using one or more signals of the one or more spurious acoustic signal generating devices of the electronic device and/or using one or more of the one or more parameters of the one or more spurious acoustic signal generating devices of the electronic device and inputting the noise reference signal into a reference input of an adaptive filtering unit to reduce the noise contribution to the captured acoustic signal.

17. Method according to claim 15, wherein step c further comprises using only one signal or parameter using a switching means.

18. Method according to claim 15, wherein step c further comprises summing up at least two of the signals and/or parameters to form the reference signal.

19. Method for improving the confidentiality of a user's touch based input to an electronic device comprising a touch sensitive surface with the steps of:
   a. providing a spurious acoustic signal in and/or around the touch sensitive surface,
   b. sensing an acoustic signal with a sensing means, the sensed acoustic signal comprising a contribution due to a touch event provided by the user on the touch sensitive surface and a contribution due to the spurious acoustic signal, wherein the ratio of the contribution due to the touch event to the spurious acoustic signal is lower or equal to 1,
   c. filtering the sensed acoustic signal based on a reference signal representative of the spurious acoustic signal thereby reducing the contribution of the spurious acoustic signal, wherein the reference signal comprises a control signal used to cause one or more spurious acoustic signal generating devices to form a spurious acoustic signal, wherein the control signal causes a change in at least one property of the spurious acoustic signal output by the one or more spurious acoustic signal generating devices, and wherein the filtering is performed based at least in part by using the at least one property to determine at least a portion of the spurious acoustic signal from the sensed acoustic signal, and
   d. determining the location of the touch event based on the filtered sensed acoustic signal.

20. Method according to claim 19, wherein the reference signal is provided by the spurious acoustic signal providing means to the filtering unit.

21. Method according to claim 19, wherein the reference signal is encrypted by the spurious acoustic signal providing means and/or the sensed acoustic signal is encrypted by sensing means and the reference signal and/or the sensed acoustic signal is/are decrypted by the filtering unit.

22. Method according to claim 19, wherein the spurious acoustic signal is white noise.

23. Method according to claim 19, wherein the spurious acoustic signal is inaudible.

24. Method according to claim 19, further comprising a step e) before or after step c) of providing at least one second reference signal of an at least one second spurious acoustic signal generating device of the electronic device and/or one or more parameters of the at least one second spurious acoustic signal generating device to improve the signal-to-noise ratio of the sensed acoustic signal or the filtered sensed signal.

\* \* \* \* \*